United States Patent

[11] 3,583,757

[72] Inventors Karl Wilfert
 Gerlingen-Waldstadt;
 Hans Gotz, Sindelfingen, both of, Germany
[21] Appl. No. 768,762
[22] Filed Oct. 18, 1968
[45] Patented June 8, 1971
[73] Assignee Daimber-Benz Aktiengesellschaft
 Stuttgart-Unterturkheim, Germany
[32] Priority Oct. 20, 1967
[33] Germany
[31] P 16 30 375.6

[54] INSTALLATION FOR REDUCING THE SOILING OF SIDE WINDOWS IN MOTOR VEHICLES
 15 Claims, 6 Drawing Figs.
[52] U.S. Cl....................................................... 296/84
[51] Int. Cl....................................................... B60j 1/20
[50] Field of Search........................................... 296/91, 93, 84; 49/500, 391

[56] References Cited
FOREIGN PATENTS
1,462,747 11/1966 France .......................... 296/91
OTHER REFERENCES
German Printed Application DAS 1235164 2/1967, Beil, 296— 93 (1 sht. dwg.-2pp. spec.)

Primary Examiner—Benjamin Hersh
Assistant Examiner—John A. Pekar
Attorney—Craig, Antonelli, Stewart & Hill ABSTRACT: An installation for reducing the soiling of side windows in motor vehicles, particularly of the type which include a windshield curved in the direction toward the body sidewalls within the area of the windshield columns, which comprises an air baffle strip provided at the windshield column which projects beyond the normal contour of the vehicle body paneling.

INVENTORS
KARL WILFERT
HANS GÖTZ

BY Craig & Antonelli

ATTORNEYS

INSTALLATION FOR REDUCING THE SOILING OF SIDE WINDOWS IN MOTOR VEHICLES

The present invention relates to an installation for the reduction of the soiling of side windows in motor vehicles, especially in passenger motor vehicles with a windshield pane curved in the direction toward the vehicle body sidewalls within the area of the windshield columns.

The side window panes of nearly all types of motor vehicles, as is known, become dirty particularly while driving on wet streets due to the fact that vehicles which drive ahead, come in the opposite direction, or pass, throw up dirt from the street which is then splashed essentially against the windshield and from there, reaches the side windows by reason of the flow about the windshield pane. As a result thereof, the visibility in the direction toward the side windows is in part considerably reduced so that the traffic safety can be impaired. This is true in particular with vehicles in which the windshield is curved, and in which the water, together with the dirt, removed from the windshield surface by the windshield wipers is able to flow off particularly easily in the direction of the side windows and can soil the same.

The present invention aims to avoiding the disadvantage of the known prior art motor vehicles in this regard. The present invention essentially consists in that air baffle strips projecting out of the contour of the vehicle body panels are mounted along the windshield columns. As a result of the excess pressure created in front of the baffle strips or bars, the rainwater and soiled water which flows against the windshield pane owing to the windshield wiper movement and the dynamic air pressure, is dammed up in front of the windshield columns, is deflected downwardly and can be conducted away from there below the side windows, so that a soiling of the side windows is avoided. An appropriate type of construction of the present invention results if the air baffle strips are constructed as channellike baffle lips open in the driving direction which in a particularly advantageous manner may be parts of the seal profile enclosing the windshield. One particularly favorable type of construction results if two baffle lips are provided at the seal profile, one behind the other as viewed in the driving direction, of which the first baffle lip forms a channel with the windshield pane surface.

The forward ends of the baffle lips as viewed in the driving direction, may be rounded off so that the air resistance coefficient of the vehicle is increased only insignificantly. However, in contradistinction to the customary flow about the windshield columns, the static pressure in front of the baffle lips is simultaneously reduced to nearly atmospheric pressure so that a considerable deceleration of the flow velocity and a corresponding damming up of the water results. Directly to the rear of the baffle lips, however, a very high vacuum or underpressure area builds up which holds back possibly overflowing water drops and permits the same to flow off not in the direction toward the side windows but downwardly. This effect is further enhanced with the type of construction having a double baffle lip so that even in the presence of a side wind, a narrow vacuum or underpressure area can be maintained to the rear of the baffle lips.

In order to assure that the soiled water conducted off in the downward direction at the end of the baffle lips can no longer impinge against the side surfaces of the side windows, provision may be made in a particularly favorable embodiment of the present invention that the air baffle strips or baffle lips pass over at the lower end into a water guide channel that extends along the lower edge of the side windows. This guide channel thereby can be formed by a longitudinal groove in the door surface which is partially covered off from above by decorative strip extending along the lower edge of the side windows.

Accordingly, it is an object of the present invention to provide a motor vehicle which avoids the aforementioned shortcomings and drawbacks encountered in the prior art by extremely simple means.

Another object of the present invention resides in an installation for reducing the soiling of the side windows in motor vehicles which is simple in construction, easy to install, and effective for the intended purposes.

A further object of the present invention resides in a motor vehicle which increases the traffic safety by continuous good visibility through the side windows.

Still another object of the present invention resides in a motor vehicle which effectively prevents rainwater and other dirty water splashed up from the road against the windshield from reaching the side windows.

A still further object of the present invention resides in an installation for reducing the soiling of side windows which achieves all of the aforementioned rims and objects without impairment of the pleasing appearance of the vehicle.

These and further objects, features, and advantages of the present invention will become more obvious from the following description when taken in connection with the accompanying drawing which shows, for purposes of illustration only, several embodiments in accordance with the present invention, and wherein.

Figure 2:
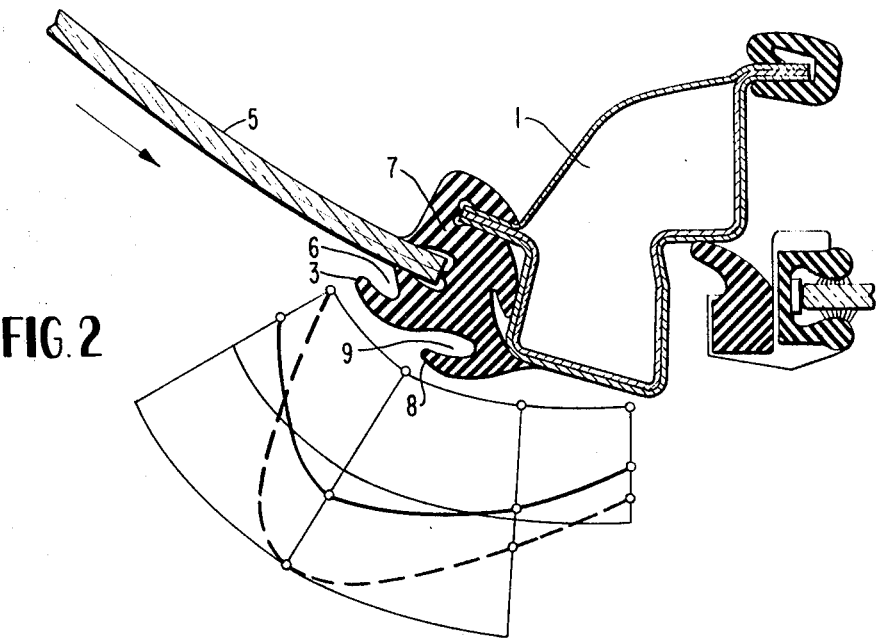
FIG. 2 is a cross sectional view, on an enlarged scale, taken along line II–III of FIG. 1.
Figure 4:
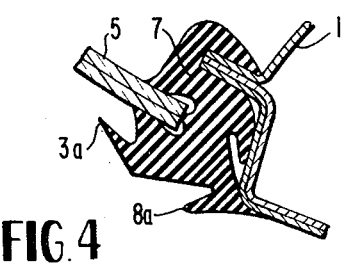
FIG. 4 is a partial cross sectional view, similar to FIG. 2, through a modified embodiment of a seal profile enclosing the windshield.
Figure 5:
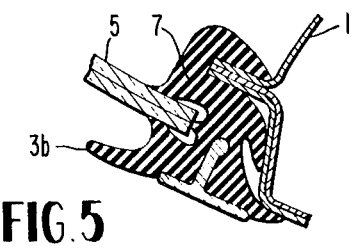
Figure 6:
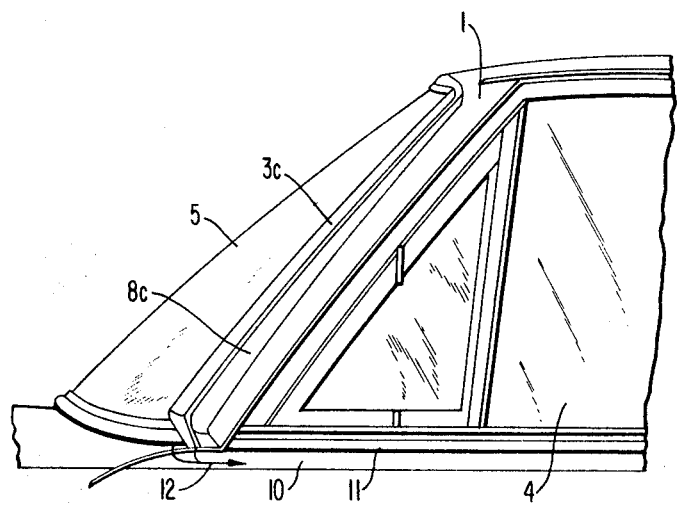

FIG. 5 is a partial cross sectional view, similar to FIGS. 2 and 4, of a still further modified embodiment of a seal profile enclosing the windshield; and FIG. 6 is a partial side elevational view, on an enlarged scale, through a modified embodiment of a windshield column of a motor vehicle equipped in accordance with the present invention with baffle strips arranged directly at the windshield column.

Figure 1:
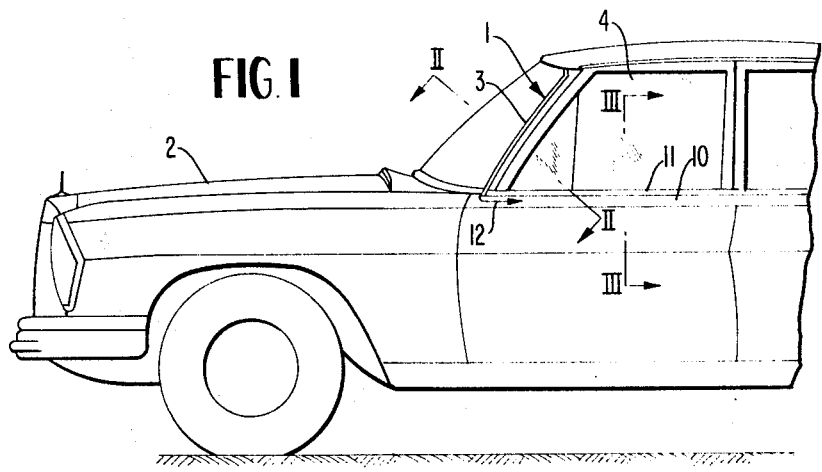
FIG. 1 is a side elevational view of a motor vehicle equipped with baffle lips according to the present invention at the border profile for the windshield pane.
Figure 3:
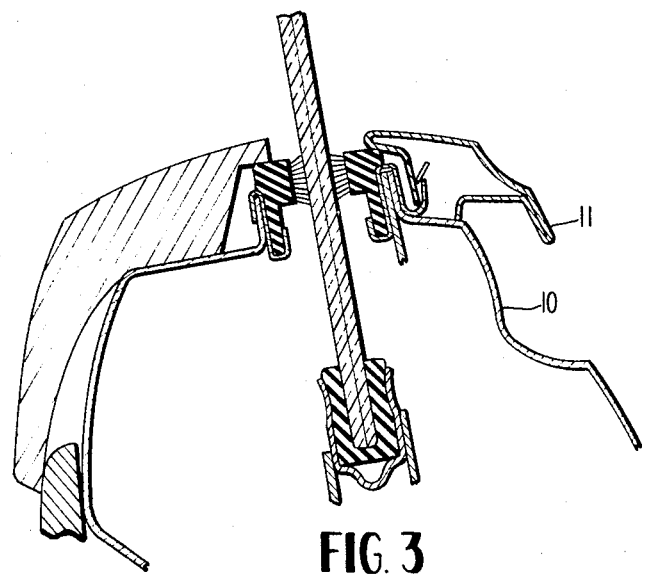
FIG. 3 is a cross sectional view, on an enlarged scale, taken along line III–III of FIG. 1.

Referring now to the drawing wherein like reference numerals are used throughout the various views to designate like parts and more particularly to FIGS. 1 to 3, there is arranged within the area of the windshield column generally designated by reference numeral 1 of a motor vehicle 2 an air baffle strip 3 which is intended to prevent soiling of the side windows 4. The air baffle strip 3 consists in this embodiment of a baffle lip 3 projecting outwardly beyond the contour of the windshield 5 and forming a hollow, rounded off channel 6 with the windshield pane surface 5 whereby the baffle lip 3 is made in one piece with the seal profile 7 retaining the windshield pane 5 in the windshield column 1. It can be seen from FIG. 2 that a further baffle lip 8 is provided which—as viewed in the driving direction—is arranged to the rear of the first baffle lip 3. The channel 6 formed between the baffle lip 3 and the windshield 5 and the channel 9 formed between the baffle lip 8 and the seal profile 7 discharge at the lower end of the baffle lips 3 and 8 into a longitudinal groove 10 (FIG. 3) provided in the door of the motor vehicle which is covered off from above by the decorative strip 11 extending along the lower edge of the side window 4. The rainwater inclusive the dirt particles, which flows off from the windshield 5 in the direction toward the lateral columns 1 and which is displaced in this direction in part also by the conventional windshield wipers (not shown), is dammed up in this embodiment within the channel 6 by reason of the dynamic pressure resulting in front of the baffle lip 3 and flows off downwardly in the direction of the arrow 12 and by way of the groove 10. The rainwater is prevented by means of the decorative strip 11 to flow up into the underpressure area occurring to the rear of the baffle lips 3 and 8 within the area of the side windows 4 so that the latter can be kept free of dirt.

The pressure distribution of the static pressure in relation to the dynamic pressure is indicated in dash line in FIG. 2 for the embodiment illustrated in this figure as occurs with the construction according to the present invention provided with baffle lips. For the purpose of comparison, the pressure distribution which would result without baffle lips is also indicated in the diagram in full lines. As can be readily seen from the diagram of the pressure curves, the static pressure in front of the baffle lip 3 can be reduced nearly to atmospheric pressure, whereas it is considerably increased within the area of the baffle lip 3. This effect can be further increased by the double arrangement of the baffle lips 3 and 8.

Another embodiment for the baffle lip 3 is illustrated in FIG. 4 in which a streamlined construction of the forward edges of the baffle lips 3a and 8a is abandoned. Even though this embodiment has a slightly higher air resistance coefficient, it offers the advantage, on the other hand, that it can still prevent a soiling of the side windows even with stronger side winds.

The simplest type of construction of the present invention is finally illustrated in FIG. 5 in which only a single baffle lip 3b is provided which, however, in contrast to the other embodiments, has a larger spacing from the windshield surface 5 so that its effectiveness is also very good. All of the embodiments illustrated in FIGS. 1 to 5 offer the advantage that no additional assembly operations are necessary and that additionally a pleasing design configuration is achieved.

Another type of construction is illustrated in FIG. 6 in which the baffle strip 3c is not a part of the seal profile for the windshield 5. The baffle strip 3c consists, for example, of metal or synthetic resinous material and is secured at the windshield column 1. The baffle strip 3c, as to the rest, is constructed similar to the baffle lips 3 of FIGS. 1 to 3 and is completed by a second baffle strip 8c which may be either a part of the windshield column 1 or may be vulcanized, for example, onto the metallic column 1 at this place. Also, this type of construction permits an appealing configuration.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are within the scope of those skilled in the art.

We claim:

1. An installation for reducing the soiling of side windows in motor vehicles, especially in passenger motor vehicles which include a windshield curved in the direction toward the vehicle body sidewalls within the area of the windshield columns, characterized by air baffle strip means provided along the windshield column and projecting beyond the contour of the motor vehicle paneling, wherein the air baffle strip means include baffle lip means open in the driving direction and constructed so as to form channel means which open toward said windshield.

2. An installation according to claim 1, wherein the channel means are rounded off along the interior thereof.

3. An installation according to claim 1, wherein the baffle lip means form a part of seal profile means enclosing the windshield.

4. An installation according to claim 3, wherein two baffle lip means are provided at a respective windshield column, one behind the other as viewed in the driving direction.

5. An installation according to claim 4, wherein the first of the two baffle lip means forms a channel together with the windshield surface.

6. An installation according to claim 5, wherein the forwardly disposed end of each baffle lip means, as viewed in the driving direction, is rounded off.

7. An installation according to claim 6, wherein the baffle lip means of the baffle strip means pass over at the lower ends thereof into a water guide channel means extending along the lower edge of the side windows.

8. An installation according to claim 7, wherein the water guide channel means is formed by a longitudinal groove in the door surface that is covered off in part from above by a decorative strip means extending along the lower edge of a respective side window.

9. An installation according to claim 1, wherein the strip means form a part of seal profile means enclosing the windshield.

10. An installation according to claim 1, wherein two baffle lip means are provided at a respective windshield column, one behind the other as viewed in the driving direction.

11. An installation according to claim 10, wherein the first of the two baffle lip means forms a channel together with the windshield surface.

12. An installation according to claim 11, wherein the forwardly disposed end of each baffle lip means, as viewed in the driving direction, is rounded off.

13. An installation according to claim 1, wherein the baffle strip means pass over at the lower ends thereof into a water guide channel means extending along the lower edge of the side windows.

14. An installation according to claim 13, wherein the water guide channel means is formed by a longitudinal groove in the door surface that is covered off in part from above by a decorative strip means extending along the lower edge of a respective side window.

15. An installation according to claim 1, wherein the forwardly disposed end of each baffle lip means, as viewed in the driving direction, is rounded off.